United States Patent

Takayama et al.

Patent Number: 5,173,718
Date of Patent: Dec. 22, 1992

[54] SCANNING HEAD

[75] Inventors: Hajime Takayama, Yokohama; Tsutomu Yadera, Chigasaki; Shigeo Ota, Kameoka; Hiroshi Okano, Yokohama, all of Japan

[73] Assignees: Matsushita Graphic Rohm Co., Ltd., Kyoto; Communication SYstems, Inc., Tokyo, both of Japan

[21] Appl. No.: 764,773

[22] Filed: Sep. 24, 1991

[30] Foreign Application Priority Data

Oct. 3, 1990 [JP] Japan .................................. 2-267857
Feb. 1, 1991 [JP] Japan .................................. 3-33685

[51] Int. Cl.⁵ .......................................... B41J 2/335
[52] U.S. Cl. ............................. 346/76 PH; 346/145; 346/139 C
[58] Field of Search .............. 346/76 PH, 145, 139 C; 400/120 HE

[56] References Cited

U.S. PATENT DOCUMENTS 4,630,073 12/1986 Hashimoto ................... 346/76 PH
4,963,886 10/1990 Fukuda et al. ................ 346/76 PH

FOREIGN PATENT DOCUMENTS 0089375 5/1985 Japan .............................. 346/76 PH
0284754 12/1987 Japan .............................. 346/76 PH Primary Examiner—Benjamin R. Fuller
Assistant Examiner—Huan Tran
Attorney, Agent, or Firm—William H. Eilberg

[57] ABSTRACT

A scanning head comprises a support member for supporting the head in pressing contact with a platen. The support member has lower strength portions spaced longitudinally of the head, and higher strength portions alternate with the lower strength portions. The support member is easily bendable at the lower strength portions, and the higher strength portions are urged by springs toward the platen. Thus, the head can come into intimate pressing contact with the platen even if the surface flatness of the support member as a whole is not strictly realized.

5 Claims, 7 Drawing Sheets

SCANNING HEAD

BACKGROUND OF THE INVENTION

1. Field of the Invention

This invention generally relates to scanning heads. More particularly, the present invention relates to improvements in a contact-type scanning head which, in use, is held in pressing contact with a platen.

2. Description of the Prior Art

As is well known, contact-type scanning heads include thermal printing heads which are widely used in facsimile machines to print transmitted information on thermosensitive paper, and contact-type image sensors which are used to read images carried on paper in close proximity thereof. Because of similarity in arrangement, the thermal printing head and the contact-type image sensor have certain requirements in common.

For conveniently explaining the problems to be solved by the present invention, reference is now made to FIGS. 9 to 11 which show three different examples of prior art thermal printing head.

A prior art thermal printing head shown in FIG. 9 comprises a support member 100 which carries a head circuit board 101. The support member 100 is made of an aluminum or aluminum alloy plate having a relatively large thickness. Thus, the support member itself is highly rigid. In use, the head circuit board 101 is held in contact with a platen 102 with thermosensitive paper interposed therebetween.

With the prior art arrangement of FIG. 9, the support member 100, which has a relatively large thickness, is usually prepared by drawing a material metal and then working the drawn plate. This manner of production is known to be rather costly, which problem is added by the relatively large thickness (i.e., large material amount) of the support member.

The cost problem itself may be reduced by utilizing a support member 110 which is formed by press-working a relatively thin steel plate, as shown in FIG. 10. The support member 110 is made to have reinforcing flanges along two longitudinal sides.

However, with the arrangement of FIG. 10, it is very difficult to realize strict surface flatness of the support member 110 over the entire length thereof when the support member is formed by press-working. On the other hand, the presence of the longitudinal reinforcing flanges imparts high rigidity to the support member. Thus, even if the support member is pressed by springs toward the platen 102, the head circuit board 101 carried on the support member cannot come into uniform contact with the platen due to bending reluctance of the support member, consequently resulting in deterioration in the printing quality.

It is conceivable to use a non-flanged thin steel plate 120 as a support member for the head circuit board 101, as shown in FIG. 11. In this case, the support member is easily bendable over the entire length thereof, and such flexibility is positively utilized to bring the head circuit board into uniform contact with the platen 102 under spring bias.

However, the prior art arrangement of FIG. 11 is disadvantageous in that the spring bias must be applied to the support member at a number of points in order to realize intimate contact over the entire length of the head circuit board 101, as indicated by arrows F. Thus, the require number of springs increases, and an apparatus (facsimile machine, printer, etc.) incorporating the printing head must be designed to have corresponding supports for the respective springs, consequently resulting in overall cost increase.

SUMMARY OF THE INVENTION

It is, therefore, an object of the present invention to provide a scanning head which can be uniformly held in intimate contact with a platen while greatly reducing the flatness requirements for a support member.

Another object of the present invention is to provide a scanning head which additionally incorporates a paper sensor in an ideal arrangement.

According to the present invention, there is provided a scanning head comprising a support member for supporting the head in pressing contact with a platen, wherein the support member has at least one lower strength portion and at least two higher strength portions arranged alternately with the lower strength portion in a scanning direction of the head, the support member being more easily bendable at the lower strength portion, each higher strength portion receiving a pressing load toward the platen.

According to the arrangement described above, the surface flatness of the support member as a whole need not strictly realized as long as the flatness of each higher strength portion is realized. The support member is pressed toward the platen at the higher strength portion by a coil spring for example, so that the support member bends at the lower strength portion. Thus, the scanning head can come into intimate pressing contact with the platen over the entire length thereof.

As a result of less strict requirements for the surface flatness, the support member can be manufactured at a lower cost. Further, the total number of springs for pressing the support member is much smaller than conventionally required, so that the interior arrangement of e.g. a facsimile machine incorporating the head can be simplified.

According to one embodiment of the present invention, the support member has a pair of longitudinal sides formed with reinforcing flanges, and at least one of the reinforcing flanges is formed with at least one strength reducing cutout at a position corresponding to the lower strength portion. In this case, the remaining portions of the support member work as the higher strength portions due to the reinforcing function of the flanges.

According to another embodiment, each higher strength portion is provided with at least one elongate reinforcing depression extending in the scanning direction. Alternatively, the higher strength portion is provided with at least one reinforcing strip extending in the scanning direction.

Preferably, the scanning head may further comprises at least one sensor means incorporated into the head in facing relation to the platen for detecting the presence and absence of paper fed to the platen.

Other objects, features and advantages of the present invention will be fully understood from the following detailed description of the preferred embodiments given with reference to the accompanying drawings.

DETAILED DESCRIPTION OF THE PREFERRED EMBODIMENTS

Figure 1:
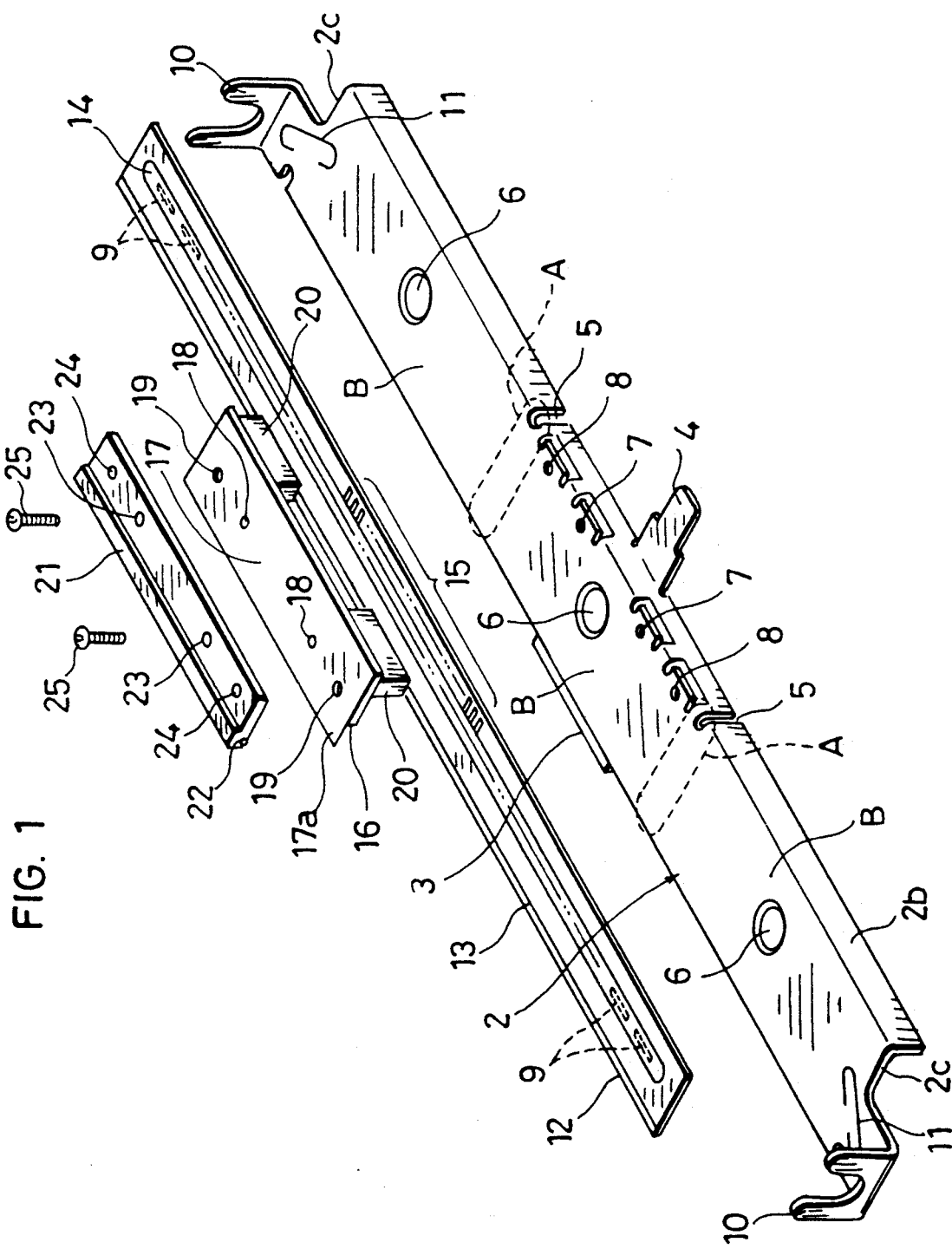
FIG. 1 is a perspective view showing a thermal printing head according to the present invention in its exploded state.

Throughout the accompanying drawings, like parts are designated by the same reference numerals and characters. Further, direction-indicating terms such "downwardly" and "upwardly" are used herein only for the convenience of explanation.

Figure 2:
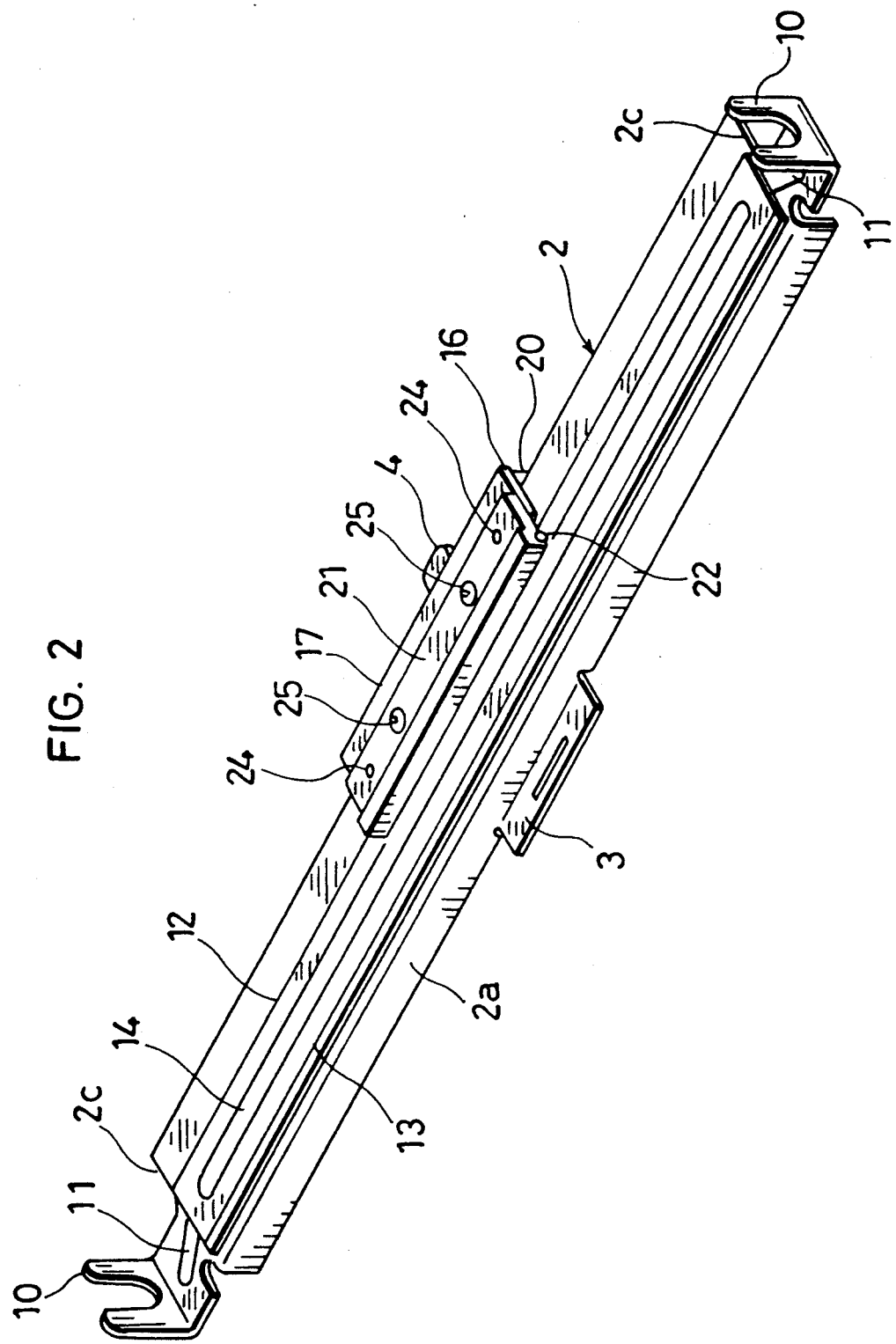
FIG. 2 is a perspective view showing the same printing head in an assembled state.

Referring first to FIGS. 1 and 2, there is illustrated a line-type thermal printing head which mainly includes an elongate support member 2, an elongate head circuit board 12, a flexible connector circuit board 17, and a presser member 21. The details of these main parts are described below.

The support member 2, which serves also as a heat sink for the head circuit board 12, is formed by press-working from a relatively thin metallic plate or sheet which is made for example of an iron-containing alloy such as steel. The support member 2 has two longitudinal sides integrally formed with downturned reinforcing flanges 2a, 2b which are, in turn, formed integrally with positioning segments 3, 4.

According to the embodiment of FIGS. 1 and 2, one reinforcing flange 2b of the support member 2 is formed with two strength reducing cutouts 5 at suitable positions. Thus, lower strength portions A are provided adjacent these cutouts. On the other hand, the remaining portions of the support member work as higher strength portions B due to the reinforcing function of the flanges 2a, 2b.

Each of the higher strength portions B is formed with a bearing portion 6 which is depressed downwardly on the upper side and projects downwardly on the lower side. The bearing portion 6 provides a position for receiving a pressing force applied by a corresponding spring 27 (see FIG. 3b) when the thermal printing head is incorporated in a facsimile machine for example. The central one of the higher strength portions B is further provided with threaded bores 7 and positioning bores 8.

Figure 3A:
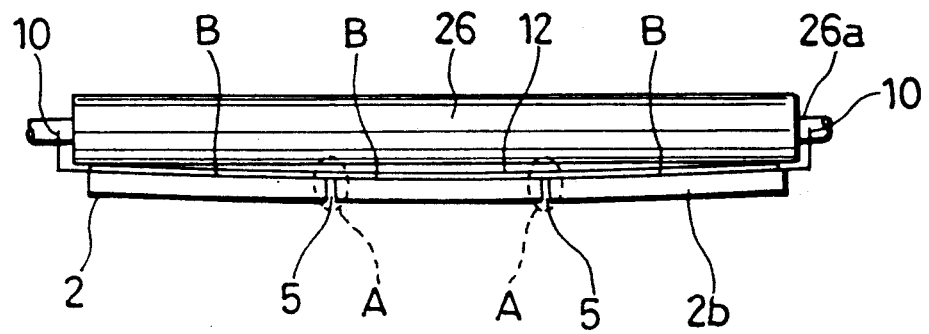
FIG. 3a is a schematic front view showing the same printing head combined with a platen without spring-bias.

The respective ends 2c of the support member 2 are provided with integral platen guides 10 which are upwardly directed and shaped to rotatably support the corresponding shaft ends 26a of a platen 26 (see FIG. 3a). The support member ends 2c may be provided with elongate depressions 11 for reinforcing the base portions of the the platen guides 10.

Obviously, the platen guides 10 may be separate from the support member 2 and fixed thereto by bolting for example. However, when the support member 2 is formed of a relatively thin steel plate, it is preferable to make the platen guides 10 integral with the support member 2 because these parts are conveniently shaped together by press-working. On the other hand, when the support member is made of a relatively soft and light metal such as aluminum or aluminum alloy, it becomes difficult to make the platen guides 10 integral with the support member for reasons of insufficient strength.

The head circuit board 12 includes an insulating substrate which is made for example of a ceramic material such as alumina. The upper or front surface of the head circuit board carries a resistor line 13 extending along one longitudinal side of the head circuit board adjacent thereto, and an array of drive IC's 9 enclosed in an elongate protective body 14 which is made of a relatively hard resin. Though not fully shown, the upper surface of the head circuit board is further formed with a sophisticated conductor pattern which includes a comb-like connection terminal portion 15 arranged adjacent to the other longitudinal side of the head circuit board within a limited central region thereof. The resistor line 13 is divisionally driven by the drive IC's 9 for providing a line of heating dots.

The head circuit board 12 may be adhesively bonded to the support member 2 only in the limited central region of the head circuit board. Thus, the head circuit board is capable of linearly expanding independently of the support member upon actuation of the printing head, thereby preventing longitudinal bending of the printing head which would result from difference in coefficient of thermal expansion between the head circuit board and the support member.

The flexible connector board 17 is made for example of a polyimide film and reinforced by a backing 16 which may be made of glass-fiber-reinforced epoxy resin. Since the comb-like connection terminal portion 15 of the head circuit board 12 is arranged in the limited central region, the flexible board 17 together with the reinforcing backing 16 need only have a correspondingly reduced length. The backing 16 supports, on its underside, connectors 20 for external connection.

The flexible connector board 17 has a front marginal portion 17a projecting beyond the reinforcing backing 16. The underside of this front marginal portion is formed with a comb-like connection terminal portion (not shown) in corresponding relation to the comb-like connection terminal portion 15 of the head circuit board 12. When assembled, the connection terminal portions of the head circuit board 12 and flexible connector board 17, respectively, are intimately overlapped, as described later.

The flexible connector board 17 together with the reinforcing backing 16 is provided with through-bores 18 corresponding to the threaded bores 7 of the support member 2. Further, the combined connector board and backing is provided with positioning bores 19 corresponding to the positioning bores 8 of the support member.

The presser member 21 substantially corresponds in length to the flexible connector board 17, and is overlapped thereon, as shown in FIG. 2. The underside of the presser member 21 is shaped to receive an elastic rod 22 which lies over the front marginal portion 17a of the flexible connector board 17. Thus, when assembled, the elastic rod 22 presses the comb-like terminal portion of the flexible board 17 into intimate contact with the comb-like terminal portion 15 of the head circuit board 12 to insure electric conduction therebetween.

The presser member 21 is also formed with throughbores 23 corresponding to the respective threaded bores 7 of the support member 2. The presser member is further formed with positioning bores 24 corresponding to those of the support member. Indicated at 25 are tightening screws inserted through the respective throughbores 18, 23 of the connector board 17 (backing 16 as well) and the presser member 21 into engagement with the threaded bores 7 of the support member 2. It should be appreciated that the positioning bores 8, 19, 24 are used only at the time of assembly (using an assembler with positioning pins inserted into these bores) for performing positional adjustment between the support member 2, the connector board 17 and the presser member 21.

With the thermal printing head described above, it is relatively difficult to realize strict flatness of the support member 2 over the entire length thereof when the support member is formed by press working. It is now assumed that the support member 2 warps downwardly as a whole, as shown in FIG. 3a. In this state, the head circuit board 12 carried on the support member cannot come into intimate contact with the platen 26.

Figure 3B:
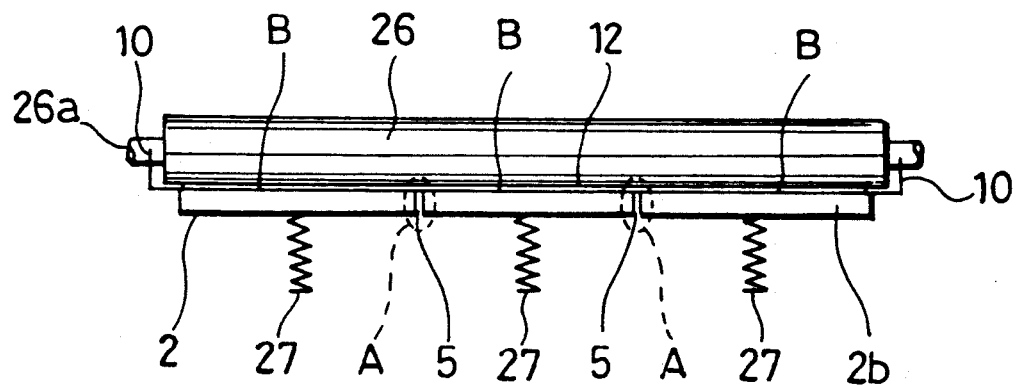
FIG. 3b is a schematic front view similar to FIG. 3a but showing the combined printing head and platen under spring-bias.

However, when actually incorporated into a facsimile machine for example, the support member 1 is pressed toward the platen 11 by the springs 27, as shown in FIG. 3b. The lower strength portions A provided by the strength reducing cutouts 5 enable easy bending of the support member 1. Thus, as long as the surface flatness of the respective higher strength portions B is realized, the head circuit board 12 (specifically the resistor line 13) can come into intimate line contact with the platen 26.

According to the present invention, the support member 1 as a whole need not have strict surface flatness. Instead, it is sufficient if the respective higher strength portions B, which are much shorter than the support member 1 itself, have surface flatness. Therefore, the support member can be press-formed more easily without deterioration of the printing quality In the foregoing embodiment, the strength reducing cutouts 5 are formed only in one flange 2b of the support member 1. However, such cutouts may be formed in both flanges 2a, 2b. Further, the number of the lower strength portions A and higher strength portions B may be optionally selected depending on various requirements.

The combination of the lower strength portions A and higher strength portions B may be provided in various ways.

Figure 4:
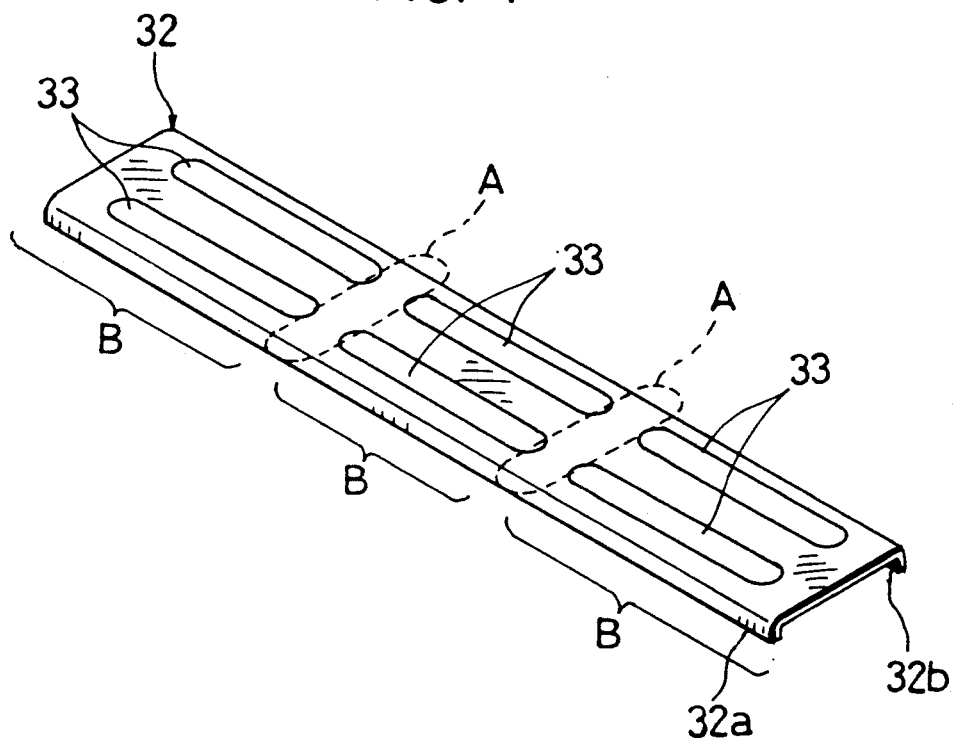
FIG. 4 is a perspective view showing a modified support member to be incorporated into the printing head.

For example, as shown in FIG. 4, a support member 32 with downturned longitudinal flanges 32a, 32b may be formed, on its upper side, with pairs of elongate reinforcing depressions 33 which project downward. Obviously, the portions of the support member 32 between the respective depression pairs 33 serve as lower strength portions A, whereas the portions of the support member carrying the depressions function as higher strength portions B.

It should be appreciated that when adopting the arrangement of FIG. 4, the longitudinal flanges 32a, 32b should be suitably adjusted in width so that the support member 32 has reasonable flexibility at the lower strength portions A. If the longitudinal flanges 32a, 32b are too wide, the support member 32 as a whole becomes too rigid and not easily bendable at the lower strength portions A.

Figure 5:
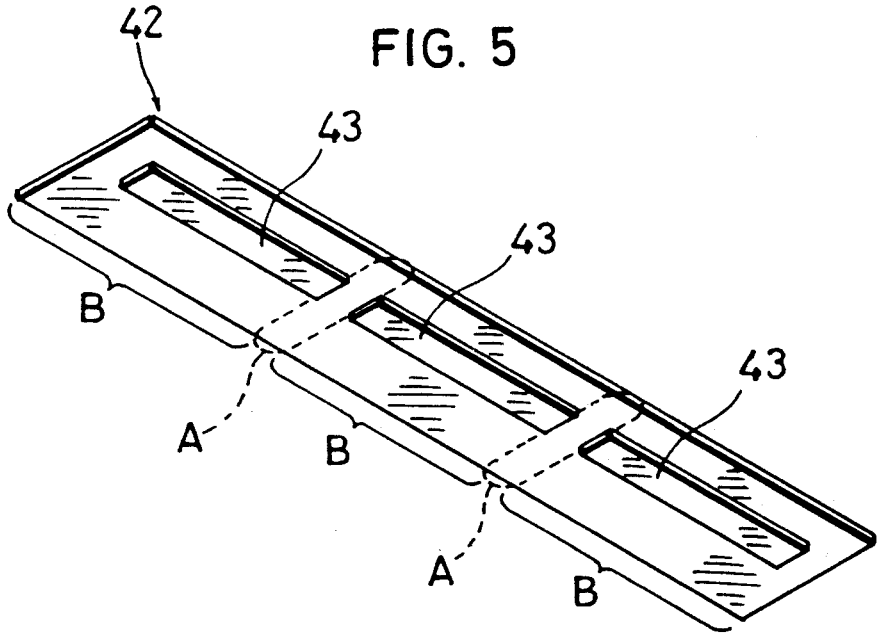
FIG. 5 is a perspective view illustrating another modified support member.

Further, as shown in FIG. 5, a non-flanged support member 42 may be provided, on its underside, with reinforcing strips 43 to provide higher strength portions B. Apparently, the portions of the support member 42 between the respective reinforcing strips 43 act as lower strength portions A. Of course, the support member 42 may be flanged along its two longitudinal sides.

The foregoing embodiment is described only in connection with a thermal printing head. However, it is obvious that the present invention is equally applicable to a contact-type image sensor.

Figure 6:
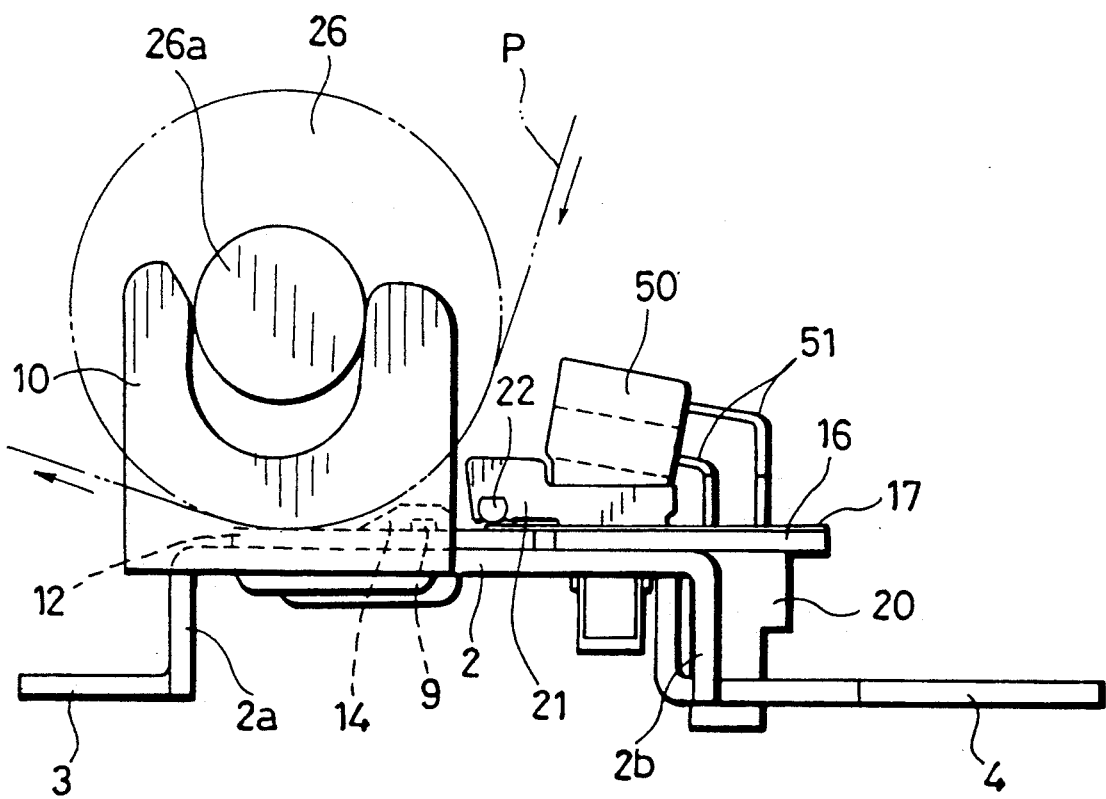
FIG. 6 is a side view showing another thermal printing head according to the present invention.

A thermal printing head (or contact-type image sensor) according to the present invention may comprise other components than described above. FIG. 6 shows an example of such additional component.

As shown in FIG. 6, at least one paper sensor 50 as an additional component may be mounted on the presser member 21 in opposition to the platen 26 rotatably supported on the platen guides 10 of the support member 2. The paper sensor 50 has leads 51 connected to the connector board 17. Obviously, the conductor pattern (not shown) formed on the connector board 17 is made to additionally incorporate a circuit for driving the paper sensor 50. Further, the connectors 20 fixed to the connector board 17 (backing 16) is commonly used for the paper sensor 50 and the components of the printing head itself.

The paper sensor 50 is used for detecting the presence and absence of the paper P guided by the platen 26. Specifically, the paper (e.g. thermosensitive paper) is normally white (or otherwise bright-colored) to have higher light reflectivity, whereas the platen 26 is normally black (or otherwise dark-colored) to have lower light reflectivity. Thus, the paper sensor can detect the presence and absence of the paper by utilizing this difference in light reflectivity.

According to the arrangement shown in FIG. 6, the printing head itself is utilized for mounting the paper sensor 50. Thus, there is no need to separately provide a sensor mounting portion within a facsimile machine for example. Further, no separate circuit and connector need be provided for driving the the paper sensor, so that the cost (including material cost) for manufacturing the combination of the printing head and the paper sensor can be greatly reduced.

Figure 7:
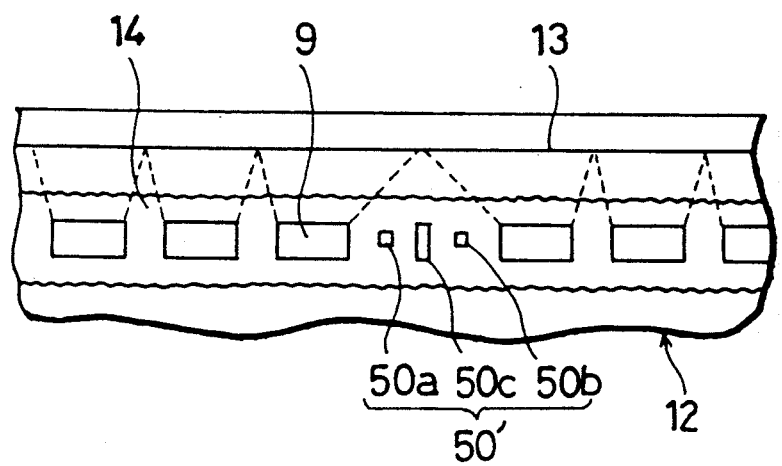
FIG. 7 is a fragmentary plan view showing still another thermal printing head according to the present invention.
Figure 8:
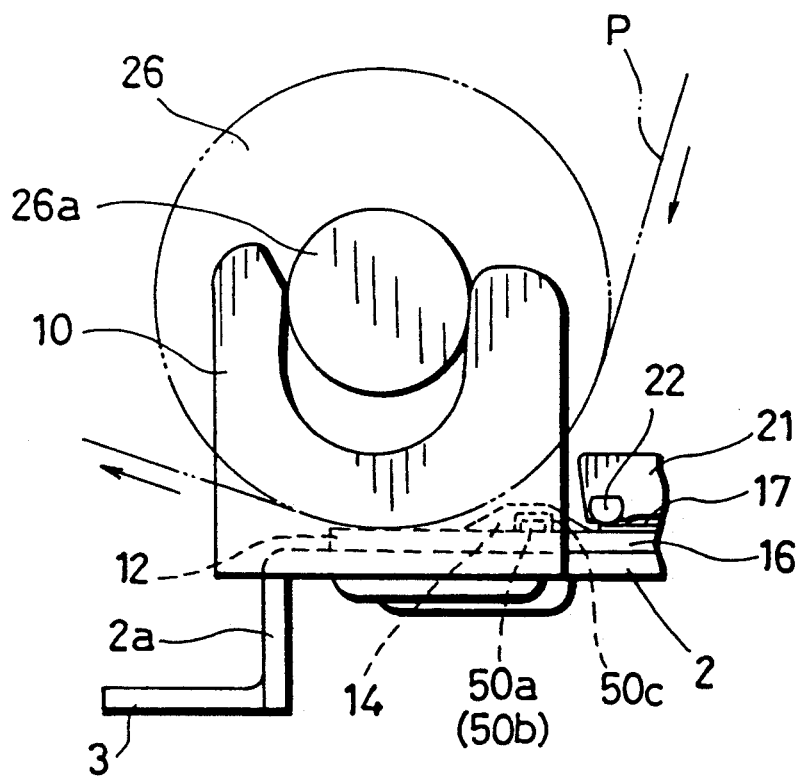
FIG. 8 is a fragmentary side view showing the thermal printing head of FIG. 7.
Figure 9:
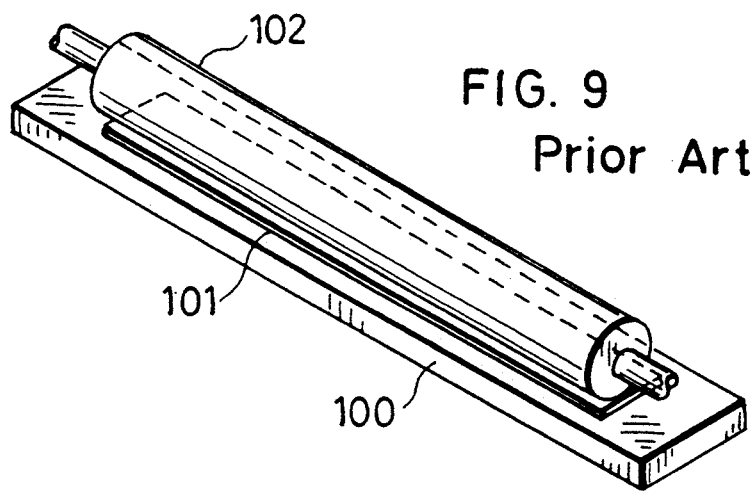
FIGS. 9 through 11 are perspective views respectively showing three different prior art thermal printing heads.
Figure 10:
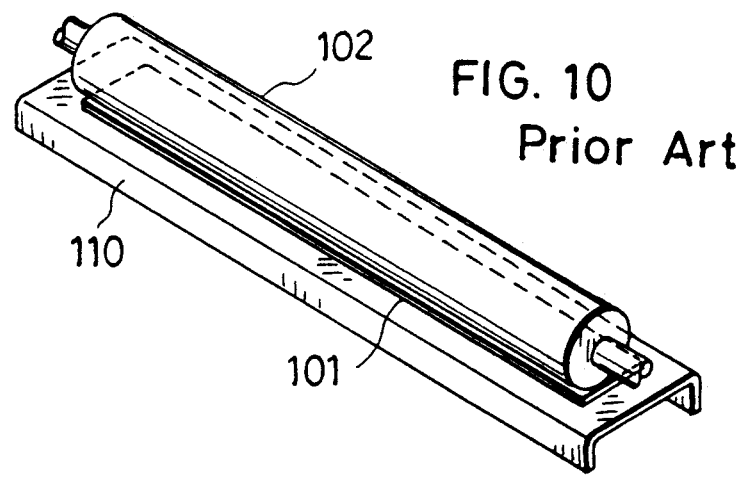
Figure 11:
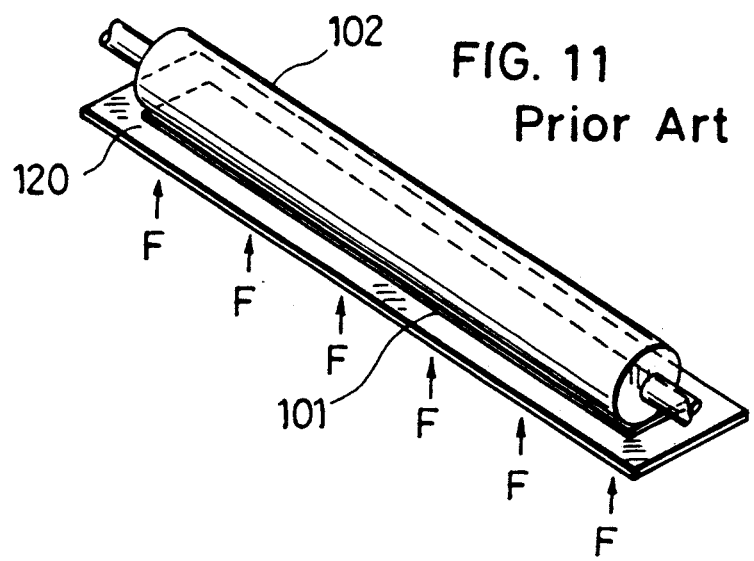

FIGS. 7 and 8 show a modification wherein a paper sensor 50' is arranged in the array of drive IC's 9 and enclosed together within the elongate protective body 14 of resin. The paper sensor 50' includes a light emitting element 50a, a light receiving element 50b, and a light shielding member 50c for preventing the light receiving element from directly receiving light from the light emitting element. Of course, the sensor 50' is electrically connected to the conductor pattern (not shown) formed on the head circuit board 12.

The arrangement shown in FIGS. 7 and 8 enjoys substantially the same advantages as that illustrated in FIG. 6. Obviously, in either of the embodiments shown in FIGS. 6 through 8, two or more paper sensors may be arranged as suitably spaced longitudinally of the head.

The present invention being thus described, it is obvious that the same may be varied in many ways. For instance, the reinforcing depressions 33 of FIG. 4 or the reinforcing strips 43 of FIG. 5 may be replaced by reinforcing ribs. Further, use may be made of a support member which has smaller thickness portions and larger thickness portions alternate with the smaller thickness portions in the scanning direction. Such variations are not to be regarded as a departure from the spirit and scope of the invention, and all such modifications as would be obvious to those skilled in the art are intended to be included within the scope of the following claims.

We claim:

1. A scanning head comprising a support member for supporting the head in pressing contact with a platen, wherein said support member is provided with at least two reinforcing means, the reinforcing means being interrupted at least once to define a lower strength portion, the parts of the support member having the reinforcing means comprising higher strength portions, each of said higher strength portions receiving a pressing load toward said platen.

2. The scanning head according to claim 1, wherein said reinforcing means comprise reinforcing flanges, wherein said support member has a pair of longitudinal sides formed with said reinforcing flanges, at least one of said reinforcing flanges being formed with at least one strength reducing cutout at a position corresponding to said lower strength portion.

3. The scanning head according to claim 1, wherein of said higher strength portions are provided with at least one elongate reinforcing depression extending in a scanning direction of the head.

4. The scanning head according to claim 1, wherein of said higher strength portions are provided with at least one reinforcing strip extending in a scanning direction of the head.

5. The scanning head according to claim 1, wherein said support member is integrally formed with a pair of platen guides for supporting said platen.

* * * * *